US005769294A

United States Patent [19]
Heinz et al.

[11] Patent Number: 5,769,294
[45] Date of Patent: Jun. 23, 1998

[54] RECESSED ACCESSORY HOOK FOR AN AUTOMOBILE

[75] Inventors: Mark F. Heinz, Toledo, Ohio; Girma M. Gebreselassie, Southfield, Mich.

[73] Assignee: UT Automotive Dearborn, Inc., Dearborn, Mich.

[21] Appl. No.: 665,740

[22] Filed: Jun. 18, 1996

[51] Int. Cl.⁶ .............................. B60R 7/08; B60R 7/10
[52] U.S. Cl. ..................... 224/567; 224/544; 224/549; 224/553; 224/925; 224/927; 248/294.1; 248/304
[58] Field of Search .................................. 224/927, 549, 224/553, 545, 567, 557, 544, 925; 248/294.1, 308, 304, 291.1, 290.1, 308.1; 211/1.3; D8/367, 372; D6/323; 410/112, 113, 114

[56] References Cited

U.S. PATENT DOCUMENTS

| | | | |
|---|---|---|---|
| D. 205,010 | 6/1966 | Swendsen | D8/367 |
| D. 209,172 | 11/1967 | Brock | D8/367 |
| D. 227,217 | 6/1973 | Pick | D8/372 |
| 2,390,257 | 12/1945 | Jahn | 248/294.1 |
| 3,185,312 | 5/1965 | Dzienisiewicz | 248/304 |
| 3,298,652 | 1/1967 | Burdick | 248/304 |
| 3,385,547 | 5/1968 | West | 248/294.1 |
| 4,221,354 | 9/1980 | Kempkers | 224/927 |
| 4,720,028 | 1/1988 | Takemura et al. | 224/313 |
| 4,993,343 | 2/1991 | Czipri | 410/112 |
| 5,411,233 | 5/1995 | Grimes, III et al. | |
| 5,415,457 | 5/1995 | Kifer | |
| 5,427,288 | 6/1995 | Trubee | |

*Primary Examiner*—Linda J. Sholl
*Attorney, Agent, or Firm*—Howard & Howard

[57] ABSTRACT

A stowable accessory hook for an automobile is supported in a surrounding wall structure having an opening defined by a peripheral rim. The distal tips of the hooks are recessed behind the peripheral rim of the surrounding wall structure to protect against inadvertent snagging and abrasions. The hooks are configured such that the distal tips are recessed, at least when not in use. In one embodiment the tip extends into a surrounding cup to be recessed. In another embodiment, a pair of sockets are formed behind the surrounding wall to rotatably receive a pair of pintles extending from a concave cup disposed in the opening in the surrounding wall structure. The cup is manually rotated about a horizontal pivot axis between stowed and operative positions. In the stoved position the tips are recessed. Either single or multiple cantilever hooks extend from the cup for securing plastic grocery and merchandise sacks, garment hangers, or the like. The cup may have a back wall which geometrically conforms to the opening in the surrounding wall structure to close the opening when the cup is in the stowed position. The back wall includes a finger catch offset laterally from the pivot axis to facilitate manipulation between the stowed and operative positions. When multiple hooks are used, they can either extend substantially parallel to one another for retaining plastic grocery and merchandise sacks, or in the alternative extend in opposing directions for securing garment hangers.

3 Claims, 4 Drawing Sheets

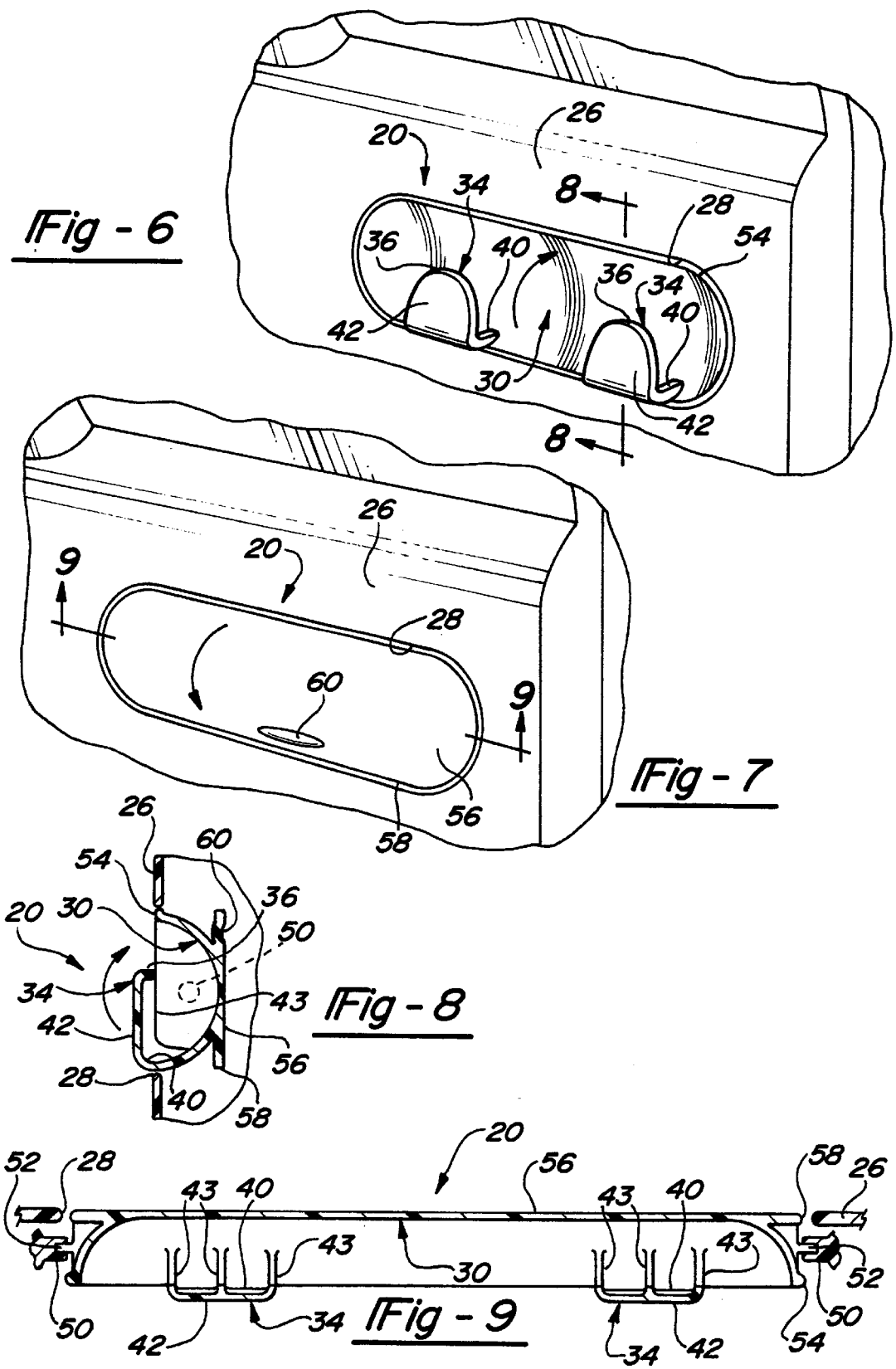

RECESSED ACCESSORY HOOK FOR AN AUTOMOBILE

BACKGROUND OF THE INVENTION

The subject invention relates to an accessory hook for a motor vehicle of the type for securing plastic grocery and merchandise sacks, garment hangers, and the like, in a safe condition during transport, and more specifically to such an accessory hook which is recessed to protect people and things from inadvertent snagging or abrasions.

Accessory hooks of the light duty type for securing plastic grocery and merchandise sacks, garment hangers, and the like, in motor vehicles are well known in the art. The known accessory hooks are used primarily to protect both the articles in the sack or on the hanger from being damaged, as well as to protect passengers in the vehicle from these same articles during transport in the event of sudden deceleration or sharp cornering. In the past, is has also been customary to use elastic netting to restrain articles during transport in the event of sudden deceleration or sharp cornering.

In the case of securing a plastic grocery or merchandise sack, the prior art accessory hook is usually located in the vehicle truck or, in the case of vans and sport/utility vehicles, in the rear cargo area. In the case of securing a garment hanger, the accessory hook is preferably located in the head liner of the vehicle or on the adjacent garnish molding. While accessory hooks for these applications are known in the prior art, such prior art embodiments tend to be costly, and perhaps most undesirably tend to cause inadvertent snagging or abrasions because the distal tip of the hook usually protrudes. The protruding distal tip of the prior art hook is also considered by many to be unsightly.

SUMMARY OF THE INVENTION

An accessory hook for an automobile is supported in a surrounding wall structure having an opening defined by a peripheral rim. The accessory hook includes a concave cup disposed in the opening in the surrounding wall structure. A first hook extends in cantilevered fashion from the cup to a distal tip. The improvement of the invention comprises a recess for recessing the distal tip of the first hook behind the rim to prevent snagging or abrasion by the distal tip of the first hook.

The recessed first hook overcomes the disadvantageous characteristics of the related prior art accessory hooks which protrude from their mounting structure. The recessed distal tip of the subject first hook avoids inadvertent snagging or abrasions to people and other objects, and instead can be accessed only by a deliberate act. The recessed distal tip also improves the aesthetic appearance of the passenger compartment of the vehicle in which it is employed.

In another embodiment of the subject invention, the first hook and concave cup are supported for rotation between stowed and operative positions with respect to the surrounding wall. In the operative position, the hook is presented and accessible for securing plastic grocery and merchandise sacks, garment hangers, and the like. In the stowed position, the first hook is not visible, thereby not only providing protection against inadvertent snagging or abrasions to people and other objects, but also concealing the somewhat aesthetically unappealing first hook.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a perspective view of a third alternative embodiment of the subject invention disposed in an operational position in the rear cargo area of a motor vehicle;

FIG. 7 is a perspective view as in FIG. 6 showing the subject accessory hook disposed in a stowed position in the rear cargo area of a motor vehicle;

FIG. 8 is a cross-sectional view taken along lines 8—8 of FIG. 6;

FIG. 9 is a cross-sectional view taken along lines 9—9 of FIG. 7;

DETAILED DESCRIPTION OF THE PREFERRED EMBODIMENTS

Figure 1:
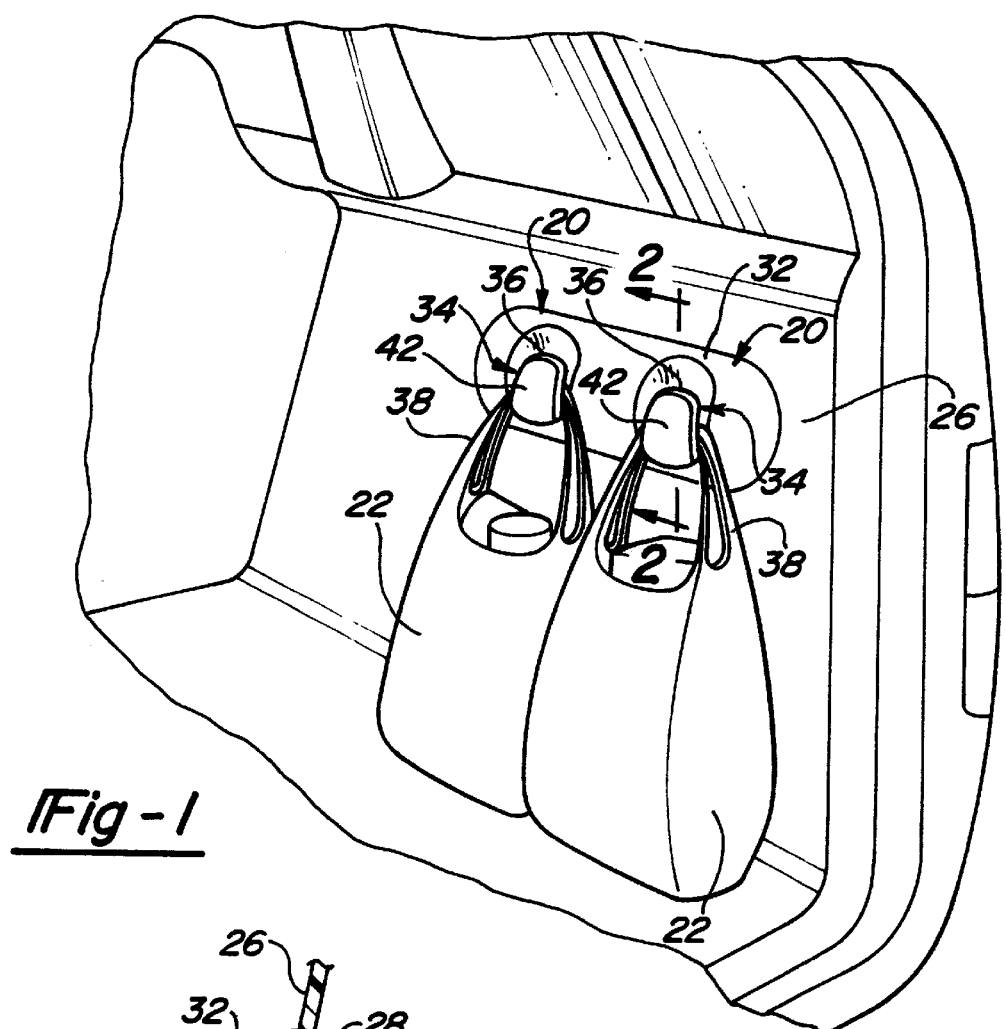
FIG. 1 is a perspective view of a first embodiment of the subject invention disposed for operation in the rear cargo area of a motor vehicle and securing plastic grocery and merchandise sacks.

Referring to the Figures, wherein like numerals indicate like or corresponding parts throughout the several views, an accessory hook for an automobile is generally shown at 20. The accessory hook 20 is of the light duty type for securing plastic grocery and merchandise sacks 22, garment hangers 24, and the like, to protect both the articles in the sack 22 or on the hanger 24 from being damaged, as well as to protect passengers in the vehicle from these same articles during transport in the event of sudden deceleration or sharp cornering.

Figure 11:
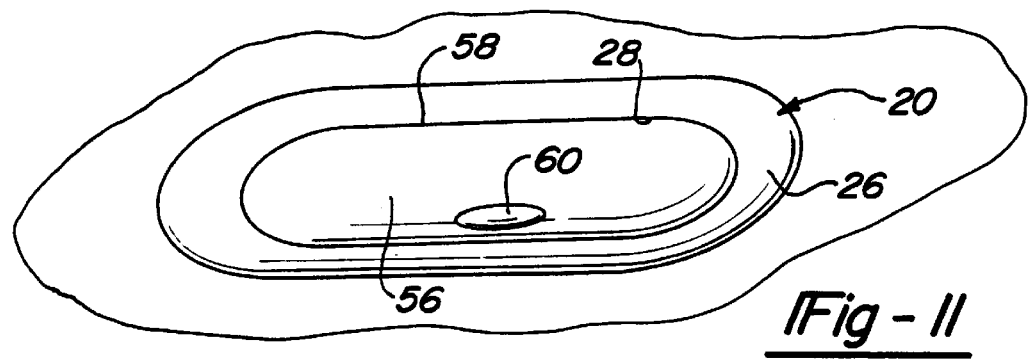
FIG. 11 is a perspective view as in FIG. 10 showing the accessory hook disposed in a stowed position in the head liner of a motor vehicle.
Figure 10:
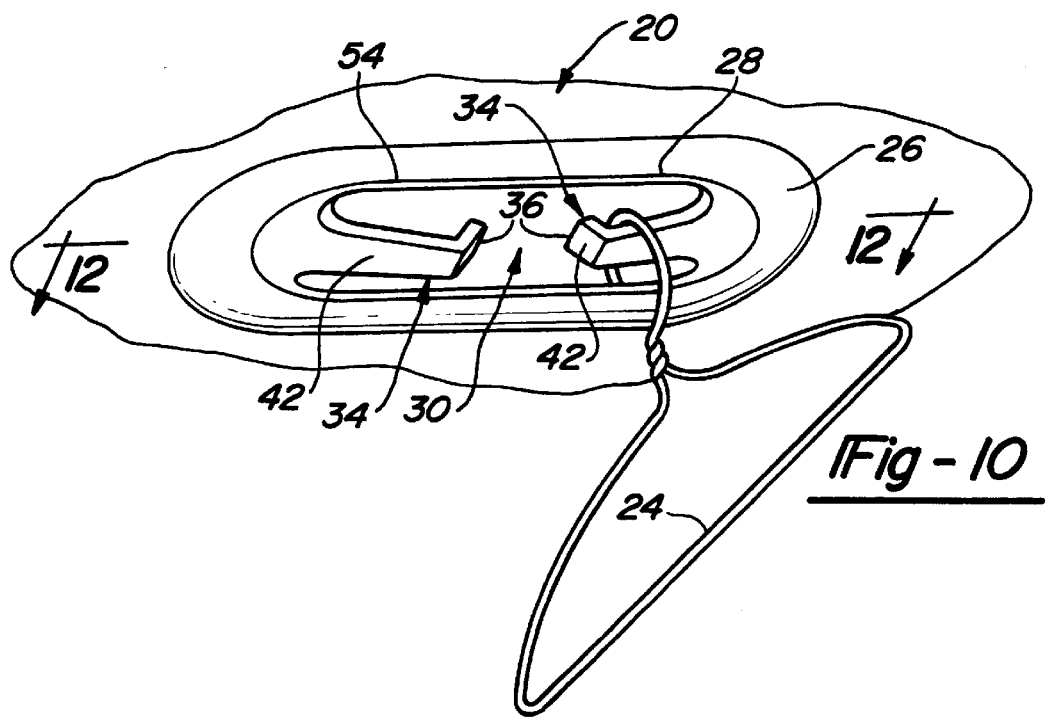
FIG. 10 is a perspective view of a fourth alternative embodiment of the subject invention disposed in an operational position in the head liner of a motor vehicle.
Figure 12:
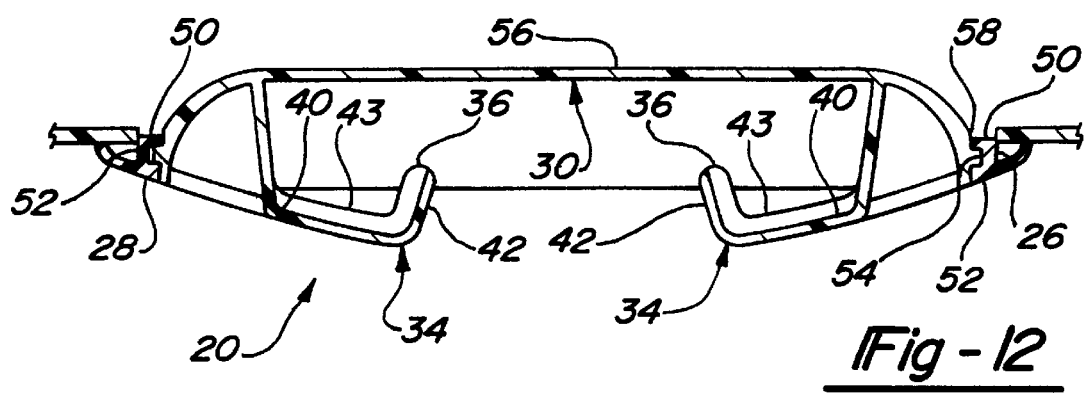
FIG. 12 is a cross-sectional view taken along lines 12—12 of FIG. 10.

In the case of use for securing a plastic grocery or merchandise sack 22, as shown in FIGS. 1–9, the accessory hook 20 is located in a surrounding wall structure 26 comprising a side wall in the vehicle trunk or, in the case of vans and sport/utility vehicles, in the interior quarter panel trim of the rear cargo area. In the case of use for securing a garment hanger 24, as shown in FIGS. 10–12, the accessory hook 20 is preferably located in a surrounding wall structure 26 comprising the head liner of the vehicle. The surrounding wall 26 has an opening defined by a peripheral rim 28.

Figure 2:
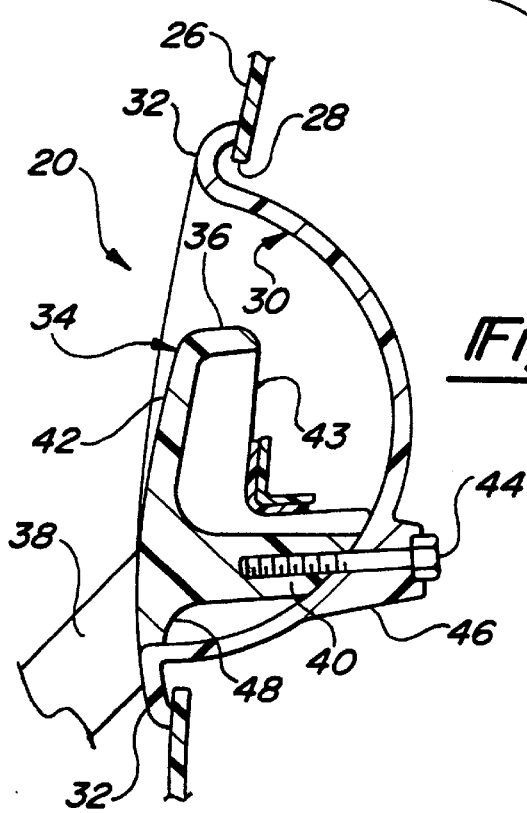
FIG. 2 is a cross-sectional view taken along lines 2—2 of FIG. 1.

According to a first embodiment of the subject invention, shown in FIGS. 1 and 2, a concave cup, generally indicated at 30, is disposed in the opening in the surrounding wall 26.

The concave cup 30 includes an outer flange 32 overlying the peripheral rim 28 of the surrounding wall 26. The cup 30 is secured in the opening of the surrounding wall 26 by any retainer means (not shown) known to those skilled in the art. In this manner, the cup 30 is non-movably seated in the opening of the surrounding wall 26. However, other advantageous variations, such as forming the cup 30 in the trim component comprising an access door to a jack, spare tire or other compartment in the interior rear quarter panel as suggested by FIG. 1, are possible without departing from the spirit of the invention as defined in the appended claims.

A first hook, generally indicated at 34, extends in cantilever fashion from the cup 30, and terminates at a distal tip 36. The first hook 34 as shown in FIGS. 1 and 2 is particularly adapted for use in anchoring the handles of a plastic grocery or merchandise sack 22. As such, the handle portions 38 of the sack 22 are looped over the first hook 34 and become seated in an interior corner formed between a base portion 40 and a frontal portion 42. Preferably, the distal tip 36 of the first hook 34 angles inwardly toward the cup 30 to encourage the handles 38 of the sacks 22 to remain in position on the first hook 34. The distal tip 36 is recessed behind the rim 28 of the surrounding wall 26 to prevent inadvertent snagging or abrasions. The frontal portion 42 has a generally planar face. At least one rib 43 extends along the rearward surface of the first hook 34 to increase structural rigidity. In the embodiment shown in FIGS. 1–5 and 10–12, two such ribs 43 are formed behind the frontal portion 42, whereas three ribs 43 are used in the embodiment of FIGS. 6–9.

In the embodiment of FIGS. 1 and 2, the first hook 34 is loose-piece molded with respect to the cup 30. The base 40 is affixed directly to the cup 30 via a threaded fastener 44. The fastener 44 extends from the concealed rearward side of the cup 30, through a small boss 46, and into a prepared hole in the base portion 40. In FIG. 2, a foot pad 48 is shown spaced from the base 40 for engaging the bottom edge of the cup 30, thereby providing additional support against deflection in the first hook 34 caused by pulling forces from the sack 22.

Figure 3:
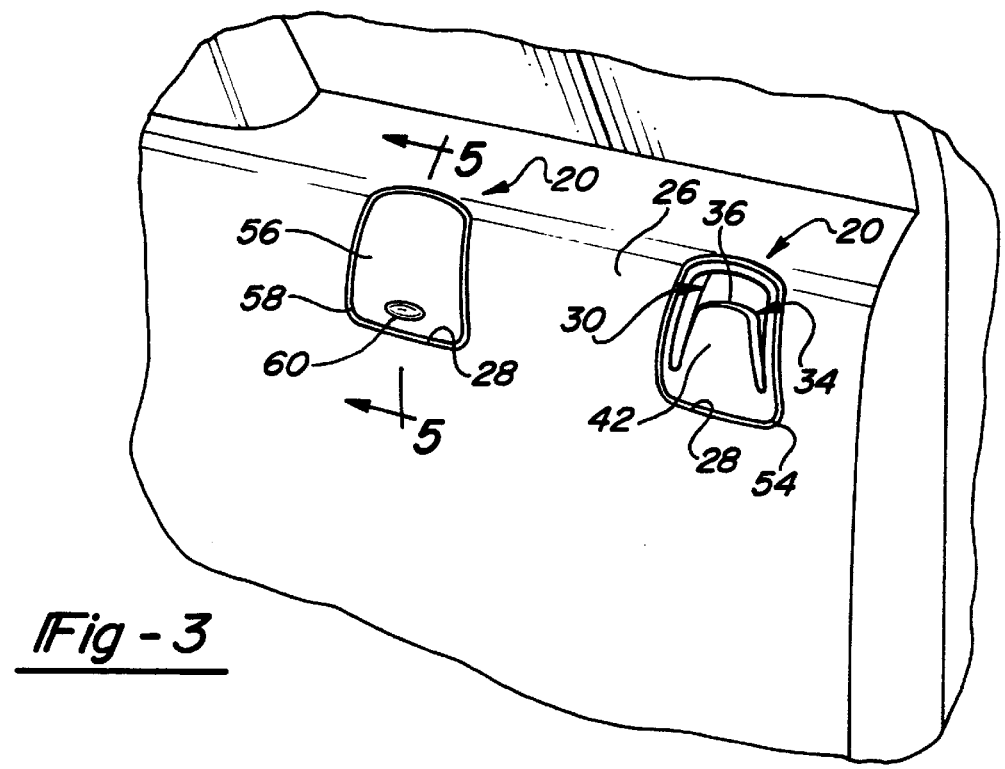
FIG. 3 is a perspective view of two spaced apart second alternative embodiments of the subject accessory hook invention disposed for operation in the rear cargo area of a motor vehicle, with the leftmost accessory hook shown in a stowed position and the rightmost accessory hook shown in an operative position.
Figure 4:
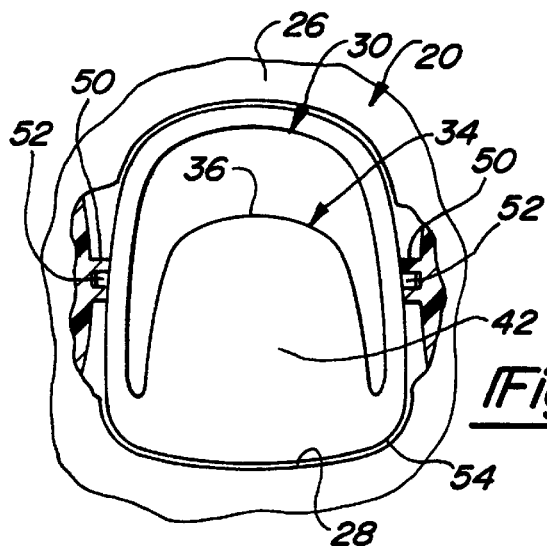
FIG. 4 is a front view of the accessory hook of FIG. 3 showing the rotatable support socket and pintle structure.
Figure 5:
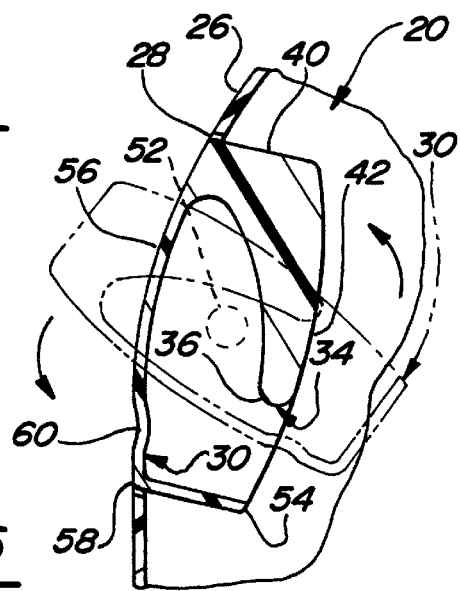
FIG. 5 is a cross-sectional view taken along lines 5—5 of FIG. 3 and showing the accessory hook partially rotated toward the operative position in phantom.

Referring now to FIGS. 3–5, an alternative embodiment of the subject invention is shown including a rotation means for rotating the cup 30 and the integrated first hook 34 between operative and stowed positions. FIG. 3 shows two identical accessory hooks 20, side-by-side in the rear quarter panel, i.e., the surrounding wall 26, of a vehicle passenger compartment. The accessory hook 20 on the right is illustrated in the operative position, so that a grocery or merchandise sack 22 can be secured in place as described above. The accessory hook 20 on the left is shown in the stowed position, providing an aesthetic appearance over the accessory hook 20 in the operative position, and protecting against inadvertent snagging or abrasions. A substantially horizontal pivot axis A allows a user to conveniently manipulate the accessory hook 20 between the stowed and operative positions.

To implement the rotatability features of this embodiment of the subject invention, the surrounding wall 26 is provided with a pair of interior sockets 50. The sockets 50 are aligned along the pivot axis A. Similarly, the cup 30 is provided with a pair of hinge pins or pintles 52 extending in opposing directions along a common pivot axis A for rotatably supporting the cup 30 and the first hook 34 relative to the surrounding wall 26. In other words, the pintles 52 and sockets 50 are coaxially positioned along the pivot axis A and function to rotatably support the cup 30 within the opening of the surrounding wall 26, so that the first hook 34 may by moved to the stowed position when not in use, behind the rim 28, to prevent unwanted snagging and abrasions. Of course, various modifications and equivalent constructions can be used to rotatably fix the cup 30 within the opening in the surrounding wall 26.

In order that dirt and other debris may not easily migrate behind the surrounding wall 26, the cup 30 is designed with a primary peripheral edge 54 substantially aligned with and proximate to the rim 28 of the surrounding wall 26 when the cup 30 is in the operative position. That is, the primary peripheral edge 54 conforms to the geometric shape and size (with clearances allotted) of the opening in which the cup 30 is supported.

To further improve the aesthetic appearance of the accessory hook 20 when in the stowed position, the cup 30 may be provided with an attractive back wall 56. The back wall 56 includes a secondary peripheral edge 58 which conforms to the geometric shape and size of the rim 28 of the surrounding wall 26 when the cup 30 is in a stowed position. Thus, the geometric shape and size of the primary 54 and secondary 58 peripheral edges are substantially identical, mirror images of one another spaced on opposite sides of the pivot axis A. The back wall 56 preferably includes a finger catch 60 comprising a simple indentation offset laterally from the pivot axis A when the cup 30 is in the stowed position. The finger catch 60 serves as an indicator instructing where to apply force so as to rotate the accessory hook 20 to the operative position.

Referring now to FIGS. 6–12, yet another improvement of the subject invention is shown including a second hook, also generally indicated at 34, extending from the cup 30. To accommodate the second hook 34, the cup 30 is preferably elongated to a somewhat oval or elliptical shape. In the embodiment shown in FIGS. 6–9, the first and second hooks 34 extend from the cup 30 in the same direction relative to the pivot axis A. That is, they are parallel to each other and extend generally perpendicular to the pivot axis A. These first and second hooks 34 are oriented as grocery or merchandise sack 22 holders, i.e., in a vertically extending direction when deployed in the operative position shown in FIGS. 6 and 8. When in the stowed position shown in FIGS. 7 and 9, the distal tips 36 are fully recessed behind the rim 28 of the surrounding wall 26 to prevent inadvertent snagging or abrasions.

In the embodiment shown in FIGS. 10–12, the first and second hooks 34 extend from the cup 30 in opposite directions relative to the pivot axis A. That is, the first and second hooks 34 extend generally parallel to the pivot axis A, and in opposing horizontally extending directions when deployed in the operative position shown in FIGS. 10 and 12. These first and second hooks 34 are oriented for use in suspending a garment hanger 24, preferably located in the head liner, i.e., the surrounding wall structure 26, of the vehicle. When in the stowed position shown in FIG. 11, an attractive domed surface is presented to the passenger compartment by the back wall 56.

The invention has been described in an illustrative manner, and it is to be understood that the terminology which has been used is intended to be in the nature of words of description rather than of limitation. In general, it could be said the embodiments all recess the hook tips, at least when not in use. In the FIG. 1 embodiment, the tips are recessed by being angled into the cup. In the other embodiments, the hooks are rotatable to a stowed position when not in use, and are thus recessed.

Obviously, many modifications and variations of the present invention are possible in light of the above teachings. It is, therefore, to be understood that within the scope of the appended claims, the invention may be practiced otherwise than as specifically described.

What is claimed is:

1. An accessory hook for an automobile comprising:
   a surrounding wall structure having an opening defined by a peripheral rim;
   a concave cup disposed in said opening in said surrounding wall structure;
   a first hook extending in cantilevered fashion from said cup to a distal tip;
   a recess for recessing said distal tip of said first hook behind said rim to prevent unwanted snagging and abrasions; and
   said hook having a base portion extending rearwardly towards a rear wall of said cup, and a fastener securing said base to said cup adjacent said rear wall, a foot pad extending downwardly from said base and contacting said cup adjacent a bottom edge of said cup, said foot pad and said base providing support to said first hook, and said distal tip angled inwardly toward said cup from said base.

2. An assembly as set forth in claim 1 wherein said first hook includes a base affixed to said cup, said distal tip angling inwardly toward said cup from said base.

3. An assembly as set forth in claim 1 wherein said first hook includes a generally planar face and at least one rib perpendicularly adjoining said face, said rib disposed on an inward face of said first hook and facing said rear wall of said cup.

\* \* \* \* \*